United States Patent
Diwakar (10) Patent No.: US 10,257,060 B2
(45) Date of Patent: Apr. 9, 2019

(54) RENDERING APPLICATION LOG DATA IN CONJUNCTION WITH SYSTEM MONITORING

(71) Applicant: CA, Inc., New York, NY (US)

(72) Inventor: Kiran Prakash Diwakar, Pune (IN)

(73) Assignee: CA, Inc., New York, NY (US)

( * ) Notice: Subject to any disclaimer, the term of this patent is extended or adjusted under 35 U.S.C. 154(b) by 200 days.

(21) Appl. No.: 15/470,308

(22) Filed: Mar. 27, 2017

(65) Prior Publication Data
US 2018/0278499 A1 Sep. 27, 2018

(51) Int. Cl.
| | |
|---|---|
| G06F 17/30 | (2006.01) |
| G06F 11/34 | (2006.01) |
| H04L 12/24 | (2006.01) |
| H04L 12/26 | (2006.01) |

(52) U.S. Cl.
CPC ............ H04L 43/045 (2013.01); H04L 41/22 (2013.01); H04L 43/0817 (2013.01)

(58) Field of Classification Search
USPC ................................ 709/224, 225, 223, 231
See application file for complete search history.

(56) References Cited

U.S. PATENT DOCUMENTS

| | | | |
|---|---|---|---|
| 6,314,449 B1 | 11/2001 | Gallagher et al. | |
| 8,874,801 B1 * | 10/2014 | Ramineni | G06F 13/385 |
| | | | 710/15 |
| 2015/0093839 A1 * | 4/2015 | Potyrailo | G01N 33/5306 |
| | | | 436/501 |
| 2015/0196801 A1 * | 7/2015 | Erkkila | A63B 71/0619 |
| | | | 700/91 |
| 2015/0212663 A1 | 7/2015 | Papale et al. | |
| 2015/0295775 A1 | 10/2015 | Dickey | |
| 2015/0341212 A1 | 11/2015 | Hsiao et al. | |
| 2016/0226731 A1 | 8/2016 | Maroulis | |
| 2017/0371761 A1 * | 12/2017 | Piga | G06F 9/45516 |

\* cited by examiner

*Primary Examiner* — Jude Jean Gilles
(74) *Attorney, Agent, or Firm* — Gilliam IP PLLC (57) ABSTRACT

Techniques for rendering application log data in a heterogeneous monitoring system are disclosed herein. In some embodiments, performance metrics are monitored by service domains that are configured within a target system that includes multiple target system entities. Each of the service domains includes agents that each monitor and record performance metric data for one or more of a set of the target system entities. In response to detecting an event based on the performance metric data, a metric object that associates an identifier of a first target system entity with a performance metric is displayed. In response to graphical input selection of the displayed metric object, an event request that specifies the first target system entity and a metric type of the performance metric is generated. In response to the event request, a search profile is generated. The search profile specifies a metric type having a dependency with the performance metric and further specifies one or more application instances within the target system. Application log requests are generated and transmitted to one or more service domain agents based, at least in part, on the search profile.

20 Claims, 6 Drawing Sheets

RENDERING APPLICATION LOG DATA IN CONJUNCTION WITH SYSTEM MONITORING

BACKGROUND

The disclosure generally relates to the field of data processing, and more particularly to data analytics and presentation implemented in conjunction with system monitoring.

Big data analytics requires increasingly efficient and flexible techniques for visualizing or otherwise presenting data from a variety of sources and in a variety of formats. For example, big data analytics took can be designed to capture and correlate information in one or more databases. The analytics took may process the information to create output in the form of result reports, alarms, etc. The vast volume of information stored in and processed by analytics systems as well as the vast variety of information sources, variety of data formats, etc., poses challenges for efficiently evaluating and presenting analytics relating to a particular issue or problem.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without some of these specific details. In other instances, well-known instruction instances, protocols, structures and techniques have not been shown in detail in order not to obfuscate the description.

Overview

In general, performance and fault management systems include native presentation tools that include graphical user interfaces (GUIs) configured to display objects associated with respective software and hardware monitoring/management applications. The monitoring/management domain of each monitoring system may or may not overlap the domain coverage of other such tools. Given multiple non-overlapping or partially overlapping monitoring domains (referred to herein alternatively as service domains) and variations in the type and formatting of collected information in addition to the massive volume of the collected information, it is difficult to efficiently render performance information across service domains while enabling efficient root cause analysis in the context of a detected problem.

Embodiments described herein include components and implement operations and functions for collecting application log data from target systems within a number of mutually distinct service domains. Embodiments may utilize performance metric data, which may include fault/error condition data, that is collected in the course of system monitoring/management to locate and retrieve log data that is native to application programs within the target system. The application log data may be processed in association with the system performance data that was utilized to obtain the application log data. For example, the application log data may be displayed in a log view window that displayably correlates (e.g., color coding) events recorded in the log data with a metric object that displays a target system entity and performance metric associated with an event.

System performance data for specified sets of target system entities are collected by and within each of multiple service domains. Each of the service domains is defined, in part, by the "target system" that it is configured to monitor and manage. For example, a target system may comprise network devices (e.g., routers, switches) within a network or a set of application program instances distributed across client nodes. The subsystems, devices, and components constituting a target system may include software, firmware, and/or hardware entities such as program instruction modules. The functional portion of a services domain includes monitoring components such as agents and/or agentless performance data collection mechanisms that detect, measure, or otherwise determine and report performance data for the target system entities. The service agents or agentless mechanisms deployed within each of the service domains are coordinated by a monitoring system host that further records the performance data in a service domain specific dataset, such as a database and/or performance data logs. In this manner, each service domain constitutes a management system that is functionally extrinsic to the operations of the target system, comprising a monitoring host and operationally related monitoring components (e.g., service agents). The service domain of the management system is further defined, in part, by a specified set of target system entities that the monitoring components are configured to collect performance data for.

Each of the management systems may be characterized as including software components that perform some type of utility function, such as performance monitoring, with respect to an underlying service domain of target system entities (referred to herein alternatively as a "target system" or a "system"). A target system may be characterized as a system configured, using any combination of coded software, firmware, and/or hardware, to perform user processing and/or network functions. For example, a target system may include a local area network (LAN) comprising network connectivity components such as routers and switches as well as end-nodes such as host and client computer devices.

In cooperation with service agents or agentless collection probes distributed throughout a target system (e.g., a network), a monitoring system host acquires performance data such as time series metrics for the constituent target system entities (e.g., routers within the network). The performance data may also or alternatively include fault information like alarms and key events impacting the target system or service. The performance metric data may include time series metrics collected in accordance with collection profiles that are configured and updated by the respective management system. The collection profiles may be configured based, in part, on specified relations (e.g., parent-child) between the components (e.g., server-CPU) that are discovered by the management system itself. In some embodiments, the collection profiles may be configured to include log data that are natively generated by application programs (application servers and application client instances). Such log data may be referred to herein in a variety of manners such as application log data, event logs, etc.

The event information and other data included in application log data is distinct from the performance metric data collected and recorded by service domain monitoring components in terms of the collection agent. Performance data is collected and recorded by monitoring components that are functionally extrinsic to the operation of the target system entities that are being monitored. In contrast, application log data that may be recorded in application event logs is collected (e.g., detected, determined) and recorded by a portion of the native application program code of a target system entity.

Example Illustrations

Figure 1:
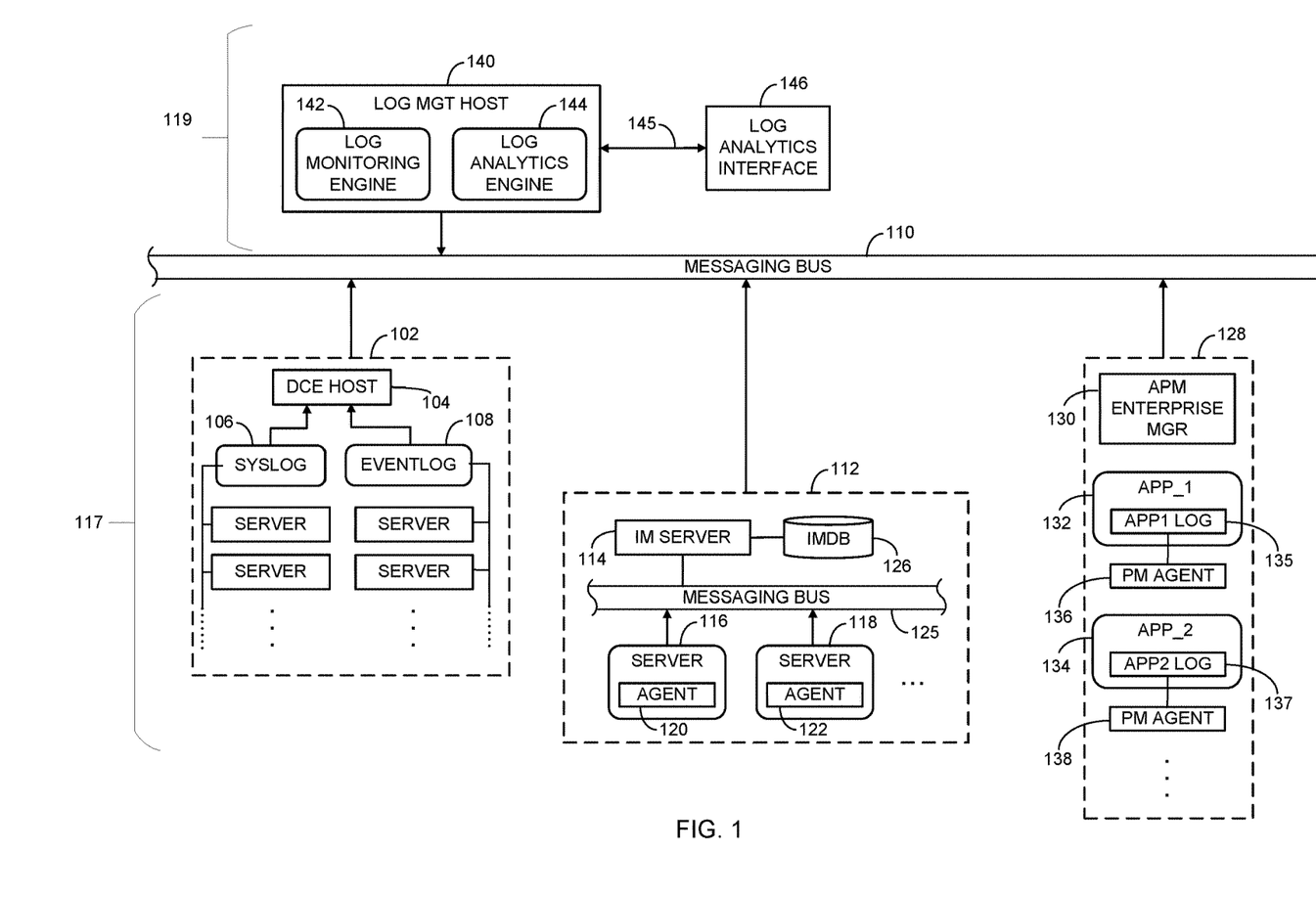
FIG. 1 is a block diagram depicting a heterogeneous system management architecture that includes multiple service domains in accordance with some embodiments.

FIG. 1 is a block diagram depicting a heterogeneous system management architecture in accordance with some embodiments. The depicted architecture includes a monitoring infrastructure 117 comprising service domains 102, 112, and 128. The architecture further includes an analytics infrastructure 119 comprising a log management host 140 and a log analytics interface 146. The components of analytics infrastructure 119 communicate with components of monitoring infrastructure 117 via a messaging bus 110. The analytics information to be presented is derived, at least in part, from operational performance data detected and collected within service domains 102, 112, and 128. Each of the service domains includes a specified (e.g., by monitor system configuration) set of target system entities that may each include combinations of software and/or hardware forming components, devices, subsystems, and systems for performing computing and networking functions. As utilized herein, a "target system entity" generally refers to a hardware or software system, subsystem, device, or component that is configured as part of the target system itself, rather than part of the monitoring system that monitors the target system. For instance, the target system entities of/within service domain 102 include multiple server entities. The target system entities within service domain 112 also include multiple servers including servers 116 and 118. The target system entities within service domain 128 include application program instances 132 and 134.

As further shown in FIG. 1, each of service domains 102, 112, and 128 further includes program components that comprise all or part of a respective management system for the service domain. Such management system components may be configured to perform support utility tasks such as monitoring performance, fault detection, trend analysis, and remediation functions. A management system typically employs operational/communication protocols distinct from those employed by the target system components. For example, many fault management systems may utilize some version of the Simple Network Management Protocol (SNMP). As utilized herein, a "service domain" may be generally characterized as comprising a management system that includes a monitoring host and one or more service agents or agentless data collection components. The service domain may be further characterized, in part, in terms of the identity of the target system entities that the monitoring components are configured to monitor. For example, a distributed management system may include multiple management system program instances that are hosted by a management system host. In such a case, the corresponding service domain comprises the management system program instances, the management system host, and the target system entities monitored by the instances and host.

The monitoring components within service domain 102 include a syslog unit 106 and an eventlog unit 108. Syslog unit 106 collects operational data such as performance metrics and informational data such as configuration and changes on the target systems from messages transacted between syslog unit 106 and a plurality of servers. Similarly, eventlog unit 108 collects operational data such as performance events (e.g., events triggering alarms) and informational data such as configuration and changes on the target systems from agentless communications between eventlog unit 108 and a plurality of servers. A distributed computing environment (DCE) host 104 functions as the monitoring host for service domain 102 and collects the log data from syslog unit 106 and eventlog unit 108. In the foregoing manner, service domain 102 is defined by the system management configuration (i.e., system monitoring configuration of DCE host 104, syslog unit 106, and eventlog unit 108) to include specified target system servers, which in the depicted embodiment may comprise hardware and software systems, subsystems, devices, and components. In some embodiments, syslog unit 106 and eventlog unit 108 may be configured to monitor and detect performance data for application programs, system software (e.g., operating system), and/or hardware devices (e.g., network routers) within service domain 102.

Service domain 112 includes a management system comprising an infrastructure management (IM) server 114 hosting an IM database 126. IM server 114 communicates with multiple collection agents including agents 120 and 122 across a messaging bus 125. Agents 120 and 122, as well as other collection agents not depicted within service domain 112, are configured within service domain 112 to detect, measure, or otherwise determine performance metric values for corresponding target system entities. The determined performance metric data are retrieved/collected by IM server 114 from messaging bus 125, which in some embodiments, may be deployed in a publish/subscribe configuration. The retrieved performance metric data and other information are stored by IM server 114 within a log data store such as IM database 126, which may be a relational or a non-relational database.

The management system components within service domain 128 include an application performance management (APM) enterprise manager 130 that hosts performance management (PM) agents 136 and 138 that are deployed within application instances 132 and 134, respectively. Application instances 132 and 134 may be client applications that are hosted by an application server such as one of servers within services domains 102 and/or 112. Application instances 132 and 134 execute on client stations/devices (not depicted). In some embodiments, application instances 132 and 134 may execute on computing infrastructure including server hardware and operating system platforms that are target system entities such as the servers within service domain 112 and/or service domain 102.

In addition to the monitoring infrastructure 117, the depicted environment includes analytics infrastructure 119 that includes program instructions and other components for efficiently processing and rendering analytics data. Analytics infrastructure 119 includes log management host 140 that is communicatively coupled via a network connection 145 to log analytics interface 146. As explained in further detail with reference to FIGS. 2-6, log management host 140 is configured using any combination of software, firmware, and hardware to retrieve or otherwise collect performance metric data from each of service domains 102, 112, and 128.

Log management host 140 includes a log monitoring engine 142 that communicates across a messaging bus 110 to poll or otherwise query each of the service domain hosts 104, 114, and 130 for performance metric log records stored in respective local data stores such as IM database 126. In some embodiments, log management host 140 retrieves the service domain log data in response to client requests delivered via analytics interface 146. Log management host 140 may record the collected service domain log data in a centralized data storage structure such as a relational database (not depicted). The data storage structure may include data tables indexed in accordance with target system entity ID for records corresponding to those retrieved from the service domains. The tables may further include additional indexing mechanisms such as index tables that logically associate performance data between service domains (e.g., index table associating records between service domains 102 and 128).

Log management host 140 further includes a log analytics engine 144 that is configured using program code or other logic design implementation to process the raw performance metric data collected by log monitoring engine 142 to generate analytics data. For instance, log analytics engine 144 may be configured to compute aggregate performance metrics such as average response times among multiple target system entities. In some embodiments, log analytics engine 144 records the analytics data in analytics data records that are indexed based on target system entity ID, target system entity type, performance metric type, or any combination thereof.

Figure 2:
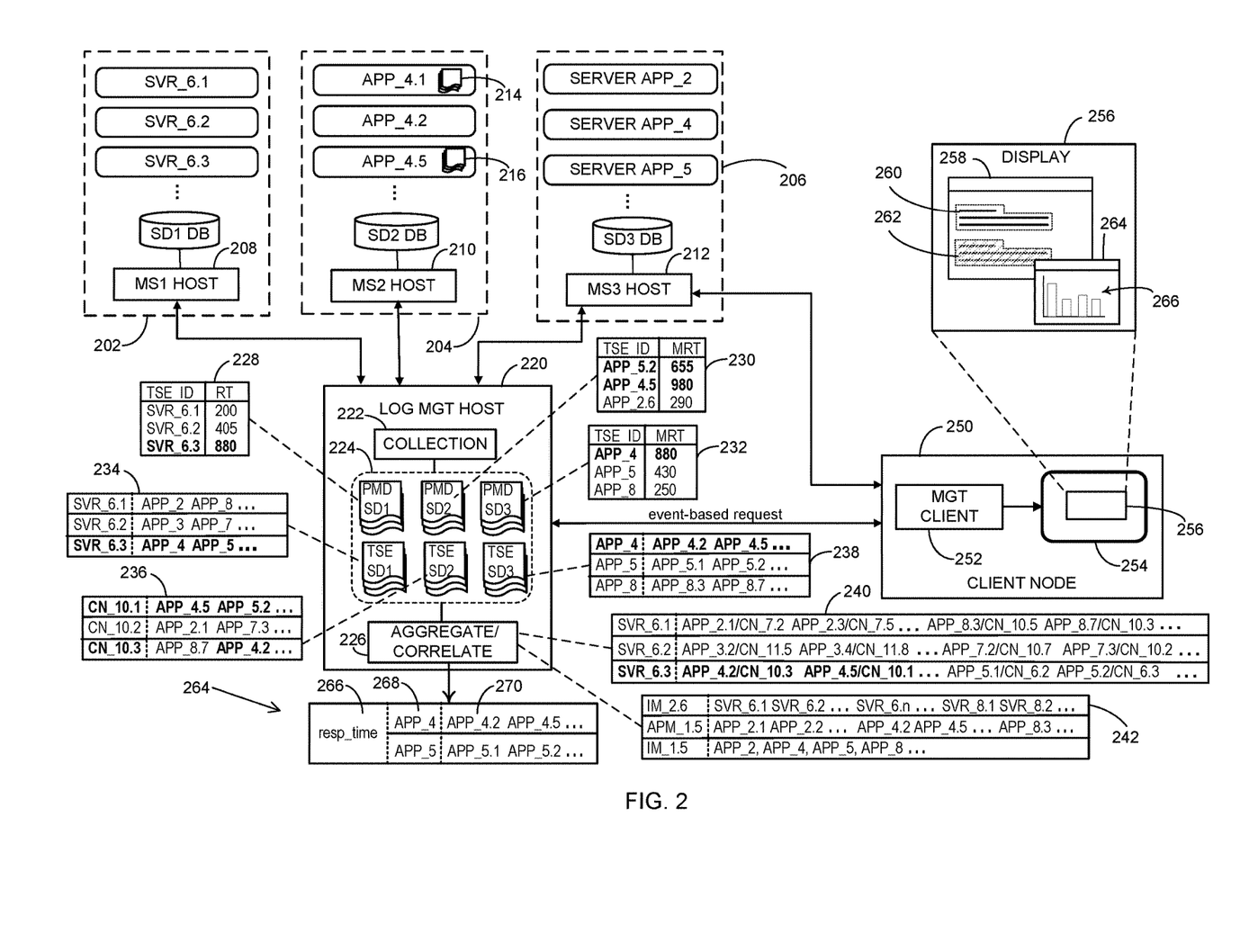
FIG. 2 is a block diagram illustrating an analytics rendering system in accordance with some embodiments.

FIG. 2 is a block diagram depicting an analytics rendering system such as may be implemented in the environment shown in FIG. 1. The analytics rendering system includes a log management host 220 that may include the features of log monitoring management host 140 depicted and described with reference to FIG. 1. As shown, log management host 220 is communicatively coupled with a client node 250 and with service domains 202, 204, and 206. Log management host 220 is configured, using any combination of software, firmware, and/or hardware, to facilitate real-time, inline processing and rendering of analytics information within client node 250 based on performance information generated from service domain performance metric data.

As shown in FIG. 2, service domains 202, 204, and 206 include respective sets of specified target system entities. The target system entities within service domain 202 include server platforms, SVR_6.1, SVR_6.2, SVR_6.3 . . . . The target system entities within service domain 204 include application program instances APP_4.1, APP_4.2, APP_4.5 . . . . The target system entities within service domain 206 include application servers, APP SERVER_2, APP SERVER_4, APP SERVER_5, . . . . While not expressly depicted in FIG. 2, each of service domains 202, 204, and 206 further includes monitoring system components for detecting, measuring, or otherwise determining performance metrics for the respective set of target system entities. As shown in FIG. 1, the monitoring system components may comprise agents or agentless metric collection mechanisms. The raw performance data collected for the target system entities are recorded by monitoring system hosts 208, 210, and 212 in respective service domain logs SD1, SD2, and SD3.

The performance metric data for one or more of service domains 202, 204, and 206 may be accessed by a management client application 252 executing on client node 250. For instance, management client 252 may be a web server client or an application server client that connects to and executes in coordination with one of monitoring system hosts 208, 210, or 212. Depending on the configuration, management client 252 may request and retrieve performance metric data from the SD1, SD2, or SD3 database based on queries sent by management client 252 to one of the corresponding monitoring hosts. The performance metric data may be retrieved as log records and processed by management client 252 to generate performance metric objects to be displayed on a display device 254. For instance, the performance metric data may be displayed within a window object 256 that includes multiple metric objects. In the depicted example, window object 256 includes an alarm panel 258 that itself includes metric objects 260 and 262. Window object 256 further includes a log analytics object 266 that may be generated in accordance with the operations and functions described with reference to FIGS. 2, 3, 4, and 5.

The depicted analytics rendering system further includes components within log management host 220 that interact with management client 252 as well as service domains 202, 204, and 206 to render application log data in conjunction with performance metrics data in a heterogeneous monitoring environment. The application log data may be recorded in application event log records such as event log records 214 and 216. In the depicted embodiment, event log records 214 and 216 are generated by the native program code of application instances APP_4.1 and APP_4.5, respectively. While in the depicted embodiment, log management host 220 is depicted as a separate component, one or more components of log management host 220 may be implemented by incorporation as components of management client 252. Log management host 220 may include a collection unit that may be configured, using any combination of coded software, firmware, and/or hardware, to perform the function of log monitoring engine 142 including collecting performance metric data from the service domains. For example, the depicted log management host 220 includes a collection unit 222 that is configured to poll or otherwise request and retrieve performance metric data from each of the mutually distinct service domains 202, 204, and 206.

Collection unit 222 may further include program instructions for generating service domain specific records dependently or independently from management client requests. Request for retrieving service domain data may include search index keys such as target system entity IDs and/or performance metric type IDs that are used to access and retrieve the resultant records from the SD1, SD2, and SD3 logs. In addition to program instructions for collecting performance metric data, collection unit 222 includes program instructions for collecting target system configuration data from service domain log records or other records maintained by monitoring system hosts 208, 210, and 212. Collection unit 222 associates the collected performance metric data and target system configuration data (collectively, service domain data 224) with respective service domain identifiers and target system entity identifiers. Service domain data 224 includes sets of performance metric and configuration data for each of the service domains. For example, the performance metric data is represented as records PMD SD1, PMD SD1, and PMD SD3, for service domains 202, 204, and 206, respectively. The target system configuration data is represented as records TSE SD1, TSE SD2, and TSE SD3, for service domains 202, 204, and 206, respectively.

The performance data within service domain data 224 may include various types and combinations of metrics related to the operation performance of target system entities. For example, the PMD SD1 records includes a performance metric table 228 that records response times (RTs) for a set of target system entities (servers each comprising hardware, firmware, and software) within service domain 202. As shown, each of the row-wise entries in table 228 associates a server ID field value with a server response time field value, which in some embodiments may represent an individual or cumulatively determined (e.g., average, max, min) response time. For service domain 206, the PMD SD3 records includes a table 232 that records maximum response times (MRTs) for a set of the target application server entities. Such an MRT value may be a value that is individually detected over a period of time of time or number of operation cycles. As shown, each of the row-wise entries in table 232 associates an application server ID field value with an MRT field value. For service domain 204, the PMD SD2 records includes a table 230 that records response times for a set of the target application instance entities. As shown, each of the row-wise entries in table 230 associates an application instance ID field value with a response time field value. As explained below, the application instance IDs for each of the records within table 230 may correspond to a corresponding client node ID, such as may be determined from configuration information within table 236.

The target system configuration data within service domain data 224 may include inter-entity connectivity data, inter-entity operational association data, and other types of data that directly or indirectly target system configuration associations among target system entities. The TSE SD1 records include record entries within a configuration table 234 that associate identifiers, SVR_6.1, SVR_6.2, and SVR_6.3, of server platforms within service domain 202 with respective sets of one or more application server identifiers. In the depicted embodiment, the server platform identifiers may function as table access keys and are associated within or by table 234 with an identifier of service domain 202. For instance, a service domain ID IM_2.6 may be included in the file name or the metadata for the file containing table 234.

The application server IDs (e.g., APP_4 and APP_5 for the third row-wise table entry) may be obtained from configuration data collected by collection unit 222 from service domain 206. For example, the second row-wise record within configuration table 234 associates the key field SVR_6.2 ID with application server IDs including APP_3 and App_7. The TSE SD3 records include a configuration table 238 having row-wise entries/records that each associate an application server ID (e.g., APP_4) that is included in service domain 206 with a set of one or more application instance IDs (e.g., APP_4.2, App_4.5 . . . ) corresponding to application instances hosted/served by the server. The TSE SD2 records include record entries within a configuration table 236 that associates client node (CN) identifiers for client nodes within service domain 204 with application instance IDs for application instance within service domain 204.

Log management host 220 further includes an aggregate/correlate unit 226 that is configured to process the inter- and/or intra-service domain target system configuration data to generate cross-domain inter-entity configuration information. The cross-domain configuration information may be recorded in tables such as table 240 from which it can be accessed and utilized for rendering application log data. In some embodiments, aggregate/correlate unit 226 compares records between the configuration tables of different service domains to determine and record cross-domain associations between and among target system entities belonging to different service domains. For instance, aggregate/correlate unit 226 generates access keys for the records in cross-domain configuration table 240 by determining identifiers of server platforms within service domain 202 in accordance with the records in configuration table 234.

A set of configuration records such as contained in configuration table 234 may be associated with a service domain identifier such as "IM_2.6," which may be the ID for service domain 202. The association may be implemented in various ways such as including the service domain ID in a file or object name of configuration table 234. Aggregate/correlate unit 226 uses the service domain IDs associated with the performance metric data records and the configuration records to locate and record cross-domain inter-entity associations. Aggregate/correlate unit 226 records such associations in cross-domain configuration table 240. For example, the first row-wise record of cross-domain configuration table 240 associates server platform ID SVR_6.1 with application instance IDs APP_2.1, APP_2.3, and APP_8.3 and corresponding client nodes CN_7.2, CN_7.5, and CN_10.5. Aggregate/correlate unit 226 may retrieve configuration records that have been updated by collection unit 222 from configuration data maintain by the monitoring system hosts to update the records within cross-domain configuration table 240.

Aggregate/correlate unit 226 processes event-based requests from management client 252 to retrieve information that may be utilized to identify operational conditions associated with an event detected by the management client. As part of event-based request processing, aggregate/correlate unit 226 accesses and processes the performance metric and configuration data within service domain data 224 in combination with cross-domain information from cross-domain configuration table 240 in the following manner. In some embodiments, an event may be detected via management client 252 detecting an input graphical selection of a metric object, such as one of metric objects 260 or 262. In response to detecting an event corresponding to a metric object indicating excessive CPU usage by SVR_6.3, management client 252 transmits an event request to log management host 220. The event request specifies the target system entity ID SVR_6.3 and an associated performance metric type, such as "% CPU," both of which are associated with the detected event such as via being displayed in association within the metric object.

In response to the event request, aggregate/correlate unit 226 utilizes the ID SVR_6.3 as an index within the tables comprising service domain data 224 to locate performance records for SVR_6.3. Unit 226 may further utilize the "% CPU" metric type to further locate records, such as the third row-wise record in table 228, that indicates a performance metric that that has a dependency relation with the "% CPU" metric type for SVR_6.3. In this case the performance metric is a response time of 880 ms. In response to determining that the 880 ms value exceeds a specified threshold (e.g., 500 ms), unit 226 accesses another SD1 table, configuration table 234, to identify application servers that are configured to execute on SVR_6.3 and which may be associated with the non-threshold response time value. In some embodiment, to determine a metric type having a dependency relation with the performance metric included in the event request, unit 226 may access dependency tables (not depicted) that associate each of a first set of performance metric types with respective ones of a second set of metric types that have a dependency relation.

Aggregate/correlate unit 226 locates the application server IDs for SVR_6.3 in the third row-wise record of table 234 including APP_4 and APP_5. Unit 226 utilizes the application server IDs as indices in the performance metric table 232, which is in within the PMD SD3 records which themselves are located by unit 226 based on the third row-wise record of service domain index table 242. Having located the records in table 232, unit 226 determines that the response time value of 880 ms for APP_4 exceeds a specified threshold. Having determined the non-threshold response time, unit 226 accesses configuration table 238 to identify application instances, including instances APP_4.2 and APP_4.5, hosted by APP_4.

Aggregate/correlate unit 226 may utilize the application instance IDs in combination with the SVR_6.3 ID to access and locate records in cross-domain configuration table 240. As shown, each row-wise record in table 240 associates a server platform ID with multiple ID pairs each comprising an application instance ID and corresponding client node ID. Using SVR_6.3 and the identifier application instance IDs as indices, unit 226 locates ID pairs including APP_4.2/CN_10.3 and APP_4.5/CN_10.1 that are each associated with SVR_6.3. Unit 226 may utilize the client node ID component of each of the located ID pairs in table 242 to locate records within the PMD SD2 records that are organized, at least in part, based on client node ID. For instance, unit 226 may locate a performance metric table 230 that records maximum response time (MRT) values for application instances APP_5.2, APP_4.5, and APP_2.6 that are configured to execute on client node 10.1.

From the records in table 230, unit 226 determines that the MRTs for APP_5.2 and APP_4.5 each exceed a specified threshold (e.g., 500 ms). In response, unit 226 generates a dependencies object 264 that specifies a search profile to collect application log data that may be associated with the event detected by management client 252. The search profile is based on information collected during the foregoing described traversal of performance metric records, configuration, records, and cross-domain configuration records. The search profile specified by dependencies object 264 includes a dependency metric descriptor, "resp_time," within an event field 266. The metric type specified within field 266 has been determined to have a dependency relation with the metric type, % CPU, included in the event request. The search profile further includes primary dependency entries, "APP_4 and APP_5," within a primary dependencies field 268, and secondary dependency entries including "APP_4.2, APP_4.5, APP_5.1, and APP_5.2," within a secondary dependencies field 270.

One or more components or devices within the analytics rendering system utilizes the generated search profile to generate and send application log requests. In some embodiments, log management host 220 transmits dependency object 264 to management client 252, which generates the application log requests based thereon. In other embodiments, log management host 220 generates and transmits the application log requests to monitoring agents for each of the application instances identified in the search profile.

Figure 3A:
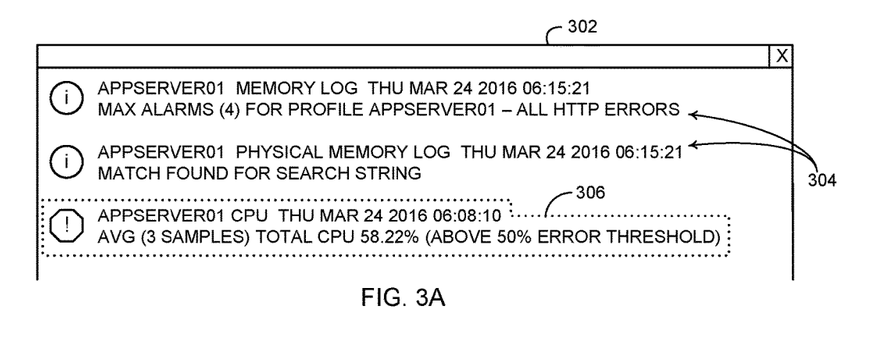
FIG. 3A depicts a monitoring panel object that includes displayed metric objects in accordance with some embodiments.

As shown in FIG. 3A, a metric object such as either or both metric objects 260 and 262 may comprise a text field specifying a target system entity ID associated with a performance metric value. FIG. 3A depicts an example alarm panel object 302 that includes multiple metric objects. Panel object 302 includes metric objects 304 in the form of monitoring messages indicating operational status of an application server APPSERVER01. Panel object 302 further includes a metric object 306 that specifies a CPU usage performance metric value indicating that the total CPU usage supporting APPSERVER01 is at 58.22%. Referring to FIG. 3A in conjunction with FIG. 2, a management client may respond to graphical input selection of metric object 306 by generating an event request that specifies the target system entity, APPSERVER01 CPU, and the performance metric type, CPU %.

Figure 3B:
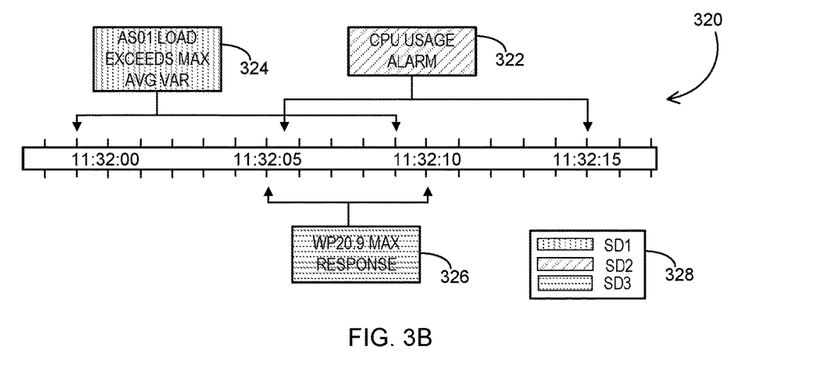
FIG. 3B depicts a log analytics object that may be displayed by a management client in accordance with some embodiments.

Various forms of analytics information may be retrieved based on the event request including application log data which may be displayably correlated with the triggering event as shown in FIG. 3B. As shown in FIG. 3B, a log analytics object 320 may be generated and displayed in response to retrieving application log data in accordance with some embodiments. Log analytics object 320 comprises a common timeline spanning a specified period over which performance metrics between a first service domain (e.g., service domain including APPSERVER01 CPU) and two other service domains are collected. For instance, a CPU USAGE ALARM event object 322 points to a timespan over which an APPERVER01 CPU alarm is active. Analytics object 320 further includes an event object 324 pointing to a span of time over which application server AS01 exceeded a specified maximum average response time value. On the same timeline, analytics object 320 further includes an application log event object 326 that points to an interval over which application instance 20.9 met or exceeded a specified maximum response time. Timeline analytics object 420 further includes a legend 328 that associates each of the respectively unique visual indicators (e.g., different colors or other visual identifiers) assigned to each of event objects 322, 324, and 326 and a respective service domain.

Figure 4:
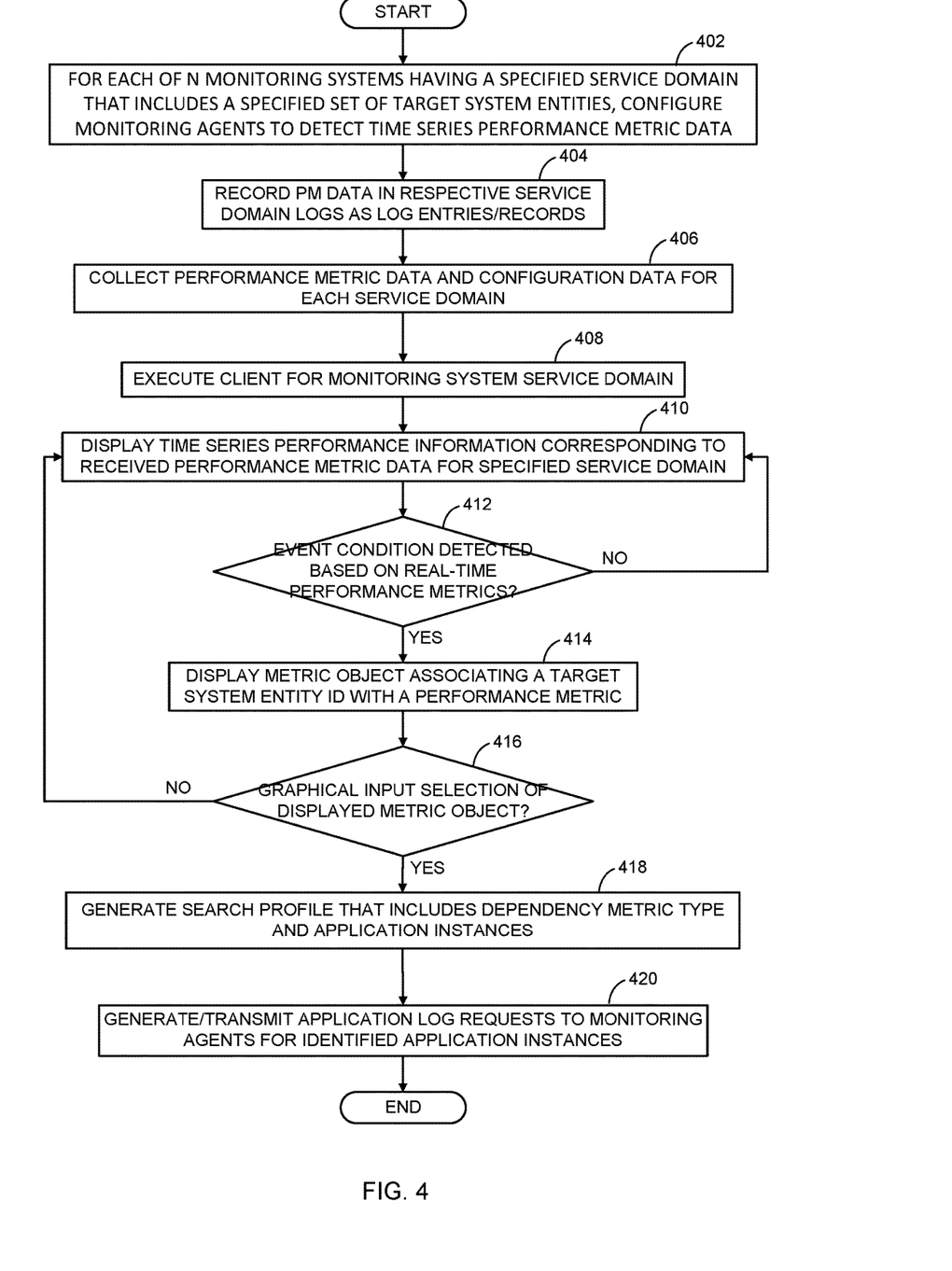
FIG. 4 is a flow diagram illustrating operations and functions for rendering application log data in accordance with some embodiments.

FIG. 4 is a flow diagram illustrating operations and functions for rendering application log data in accordance with some embodiments. The operations and functions depicted and described with reference to FIG. 4 may be implemented by one of more of the systems, devices, and components illustrated and described with reference to FIGS. 1 and 2. The process begins as shown at block 402 with one or more monitoring system hosts configuring monitoring agents to detect performance metric data for each target system entity included within each of the respective domains. As described with reference to FIGS. 2 and 3A, the performance metric data may be detected and recorded as time series data with performance metric values being record with respective time stamps. At block 404, the monitoring system hosts for each of the service domains records performance metric and configuration data for its respective domain in a service domain log which may be accessed directly or indirectly (via the host) by a management client.

At block 406, a log management host, such as log management host 220, collects performance metric data and configuration data from each of the service domain logs. The performance data may be collected directly or indirectly via requests to the respective monitoring system hosts. At block

410, a client node executes a management client for one of the service domains. As depicted and described with reference to FIGS. 2 and 3A, the management client may display time series performance metric data from the service domain corresponding to the management client. In some embodiments, the management client may transmit a request to the monitoring system host to provide particular type of performance data for specified target system entities within the service domain.

During display of the time series performance metric data, an event may be detected that may indicate, for example, a specified operational metric such as CPU usage being exceeded by a target system entity (block 412). In response to detecting the event, the management client displays a metric object that associates a target system entity with a performance metric (block 414). If, at block 416, the management client detects graphical input selection (e.g., user selection by pointing device) of the metric object, the management client and a log management host process service domain performance metric data and configuration data to generate a search profile (block 418). The generated search profile may include a metric type having a dependency with the performance metric within the selected metric object. As depicted and described with reference to FIG. 2, the search profile further includes one or more application instances to which application log requests are to be sent based on determined cross-domain configuration dependencies. At block 420, the log management host and/or the management client generate and transmit application log requests to each of the monitoring agents for the application instances specified by the search profile. The information received in response to the requests may be displayed by the management client in association with other analytics information such as information associated with the selected metric object.

Figure 5:
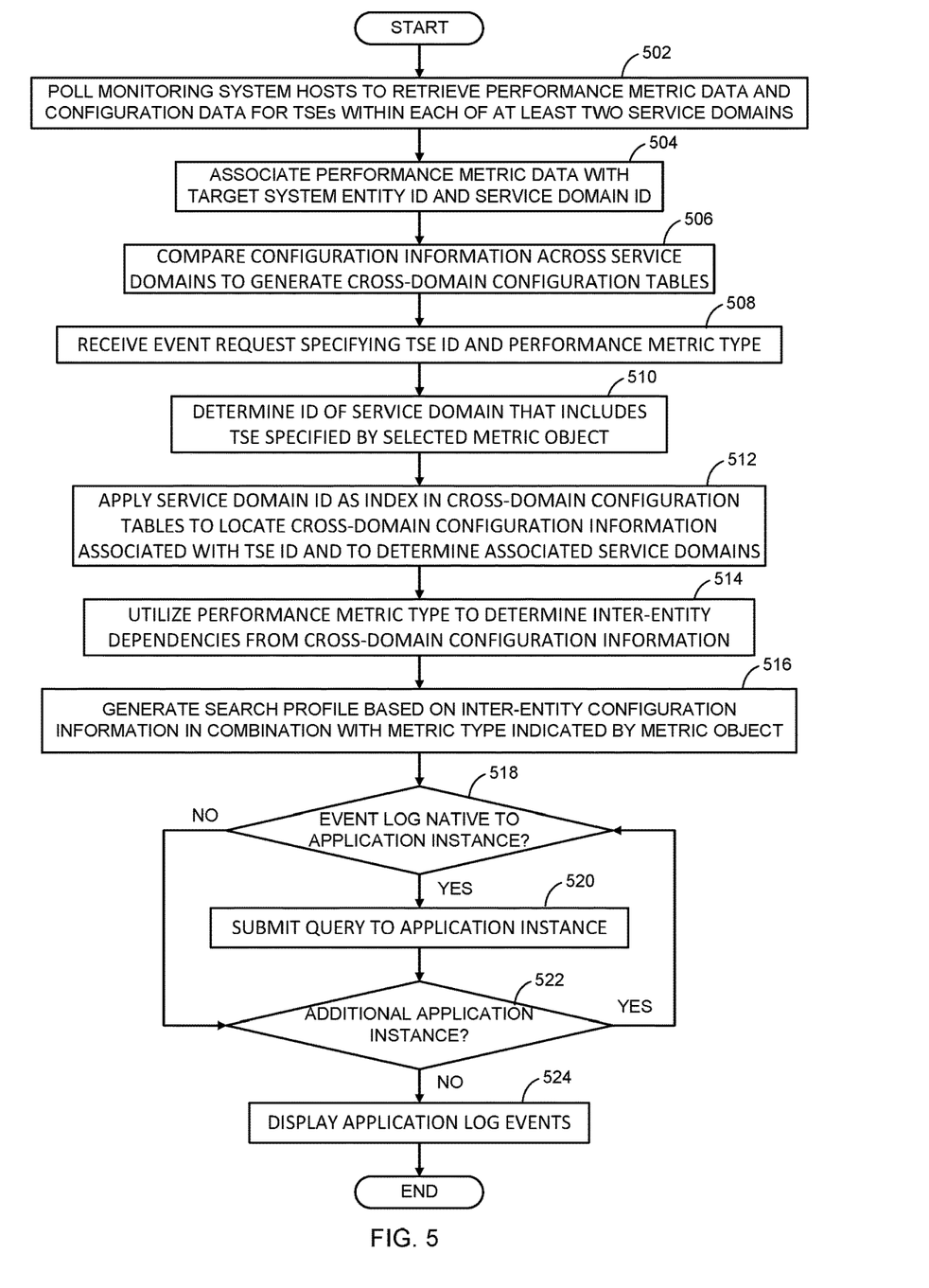
FIG. 5 is a flow diagram depicting operations and functions for generating and utilizing cross-domain configuration data and performance metric data in support of rendering application log data in accordance with some embodiments.

FIG. 5 is a flow diagram depicting operations and functions for generating and utilizing cross-domain configuration data and performance metric data in support of rendering application log data in accordance with some embodiments. The operations and functions depicted and described with reference to FIG. 5 may be implemented by one of more of the systems, devices, and components illustrated and described with reference to FIGS. 1 and 2. The process begins as shown at block 502 with a log management host polling monitoring system hosts for each of multiple service domains to retrieve performance metric data, configuration data, and configuration updates. The log management host further performs background processing on the collected performance and configuration data to generate service domain specific records that can subsequently be used in response to an event request from a management client. As shown at block 504, the log management host associates performance metric data (e.g., metric values associated with timestamps) with identifiers of the target system entity from or with respect to which the metrics are detected. The performance metric data/records are further associated with an identifier of the service domain from which the metrics where obtained.

As depicted and described with reference to FIG. 2, the log management host compares configuration across different service domains to generate cross-domain configuration tables (block 506). In some embodiment, the records of the cross-domain configuration tables associate target system entities IDs from one service domain with target system entities IDs from one or more other service domains. At block 508, the log management host receives an event request from a management client that is supported by one of the service domains. The event request includes an ID of the target system entity and a performance metric type (e.g., average response time). In some embodiments, the target system entity ID and performance metric type specified by the event request correspond to an entity ID and metric type displayed as part of a metric object by the management client. The log management host may determine an ID of the service domain that includes the specified target system entity (block 510). For instance, the log management host may map the target system entity ID to one of multiple service domain IDs that the log management host maintains in association with performance metric and configuration data collected from the service domains.

At block 512, the log management host applies the service domain ID as an index in the cross-domain configuration tables/records to locate cross-domain configuration information associated with the target system entity ID. In addition, the service domain ID can be used to identify service domains associated with the cross-domain configuration information. Having located the cross-domain configuration information, the log management host utilizes the metric type to determine inter-entity dependencies such as between the specified target system entity and application instance entities in other service domains (block 514). The log management host then generates a search profile based on the inter-entity configuration information in combination with the metric type specified by the metric object (block 516). As depicted and described with reference to FIG. 2, the search profile may be contained within a dependencies object that includes a dependency metric in association with one or more application instance IDs.

The log management host individually or in cooperation with the management client may utilize the search profile to selectively retrieve application log data as shown beginning at block 518. For each application instance identified as having a dependency relation in the search profile, the log management host, individually or in combination with service domain monitoring agents, determines whether the instance includes an event log native to the instance (block 518). In response to determine that the instance includes a natively generated event log, the log management host submits a log query to obtain log information from the instance (block 520). The process continues at block 522 and iterates similarly until log queries have been submitted to all qualifying application instances. The process concludes with application log data that is retrieved in response to the queries being displayed by the management client at block 524.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
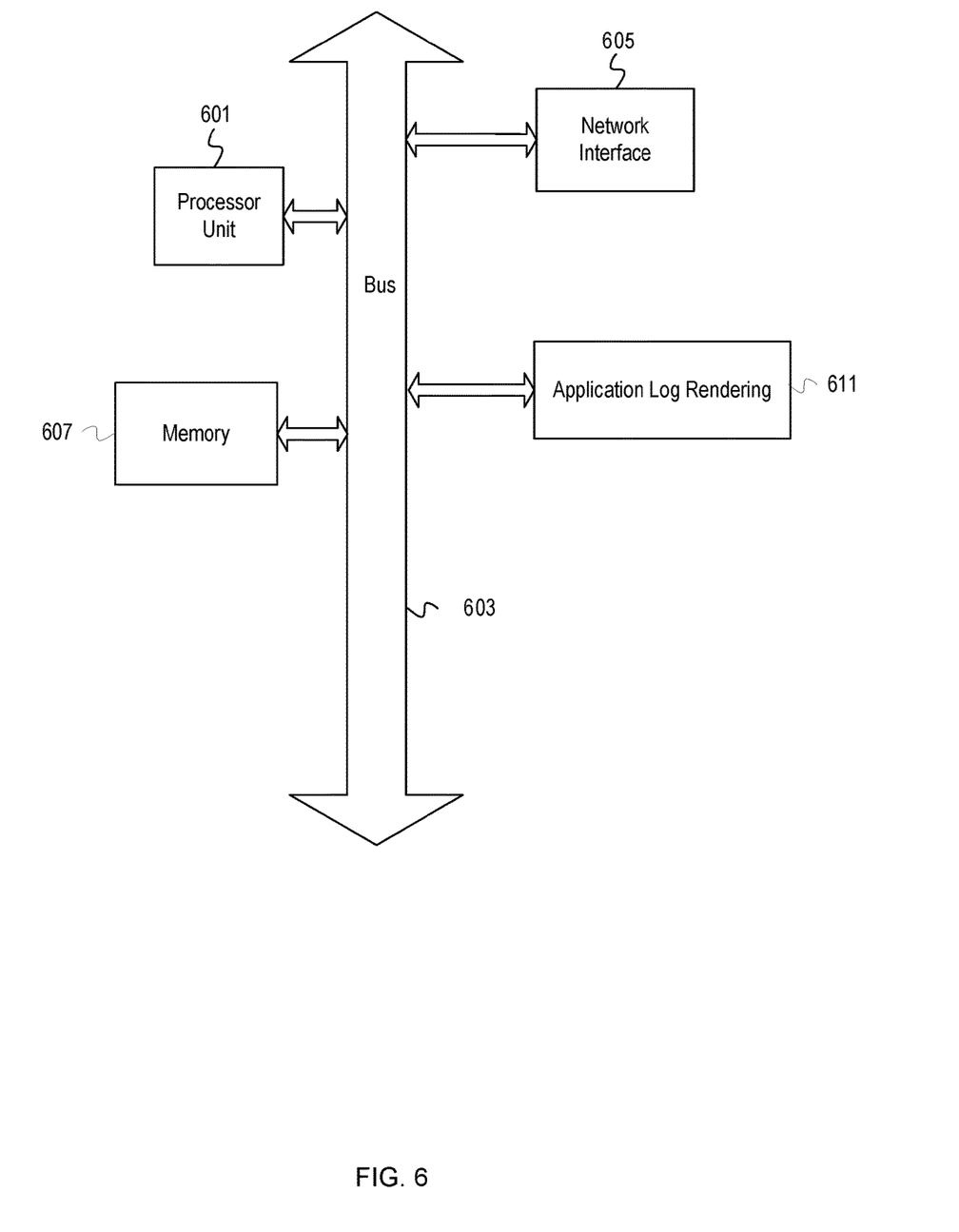
FIG. 6 is a block diagram depicting an example computer system that implements application log rendering in accordance with some embodiments.

FIG. 6 depicts an example computer system that implements application log data rendering in a data processing environment in accordance with an embodiment. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes an application log rendering system 611. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for presenting analytics data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:
1. A method comprising:
monitoring performance data in service domains that are configured within a target system that includes multiple target system entities, wherein each of the service domains includes agents that monitor and record performance metric data for a set of the target system entities;

in response to detecting an event based on the performance metric data, displaying a metric object that associates an identifier (ID) of a first target system entity with a performance metric;

in response to graphical input selection of the displayed metric object, generating an event request that specifies the first target system entity and a metric type of the performance metric;

in response to the event request, generating a search profile that specifies:
   a metric type having a dependency with the performance metric; and
   one or more application instances within the target system; and generating and sending application log requests to one or more service domain agents based, at least in part, on the search profile.

2. The method of claim 1, further comprising:
generating cross-domain target system configuration information including,
   determining target system entity configuration information from within each of at leas two of the service domains; and
   comparing the target system entity configuration information from within each of at least two of the service domains to generate inter-entity configuration information for target system entities in different service domains.

3. The method of claim 2, further comprising generating the search profile including:
   identifying a first service domain that includes the first target system entity; and
   utilizing a service domain ID corresponding to the identified first service domain to locate inter-entity configuration information associated with the first target system entity.

4. The method of claim 3, wherein said utilizing the service domain ID comprises utilizing the service domain ID as an index within the cross-domain configuration information to locate inter-entity configuration information associated with the first target system entity.

5. The method of claim 3, further comprising identifying the one or more application instances, said identifying the one or more application instances comprising:
   locating application performance data for application instances external to the first service domain; and
   correlating the application performance data to determine performance dependencies between the first target system entity and application instances external to the first service domain.

6. The method of claim 5, wherein said generating and sending log requests comprises:
   for each of at least one of the application instances for which a performance dependency is determined,
      determining whether the application instance includes an event log native to the application instance; and
      for each application instance determined to have an event log, querying the event log based on the log request.

7. The method of claim 6, wherein the event log includes a file that records events that are logged by an application instance, said method further comprising displaying the recorded events within a log view window that displayably correlates the recorded events with the displayed metric object.

8. The method of claim 1, wherein each of the application log requests includes a query element that indicates at least one metric type that is determined based on the metric type having a dependency with the performance metric.

9. The method of claim 1, wherein each of the application log requests includes:
   a query string that specifies keys for entries within an event log to be collected between begin and end timestamps; and
   a begin timestamp and end timestamp that indicate a portion of event log records to be collected.

10. The method of claim 1, further comprising each of the one or more service domain agents generating a log query instruction compliant with a log file access protocol.

11. The method of claim 1, wherein said generating and sending comprises generating and sending application log requests to respective agents for each of the one or more application instances.

12. One or more non-transitory machine-readable storage media comprising program code for rendering system management data, the program code to:
   monitor performance data in service domains that are configured within a target system that includes multiple target system entities, wherein each of the service domains includes agents that monitor and record performance metric data for a set of the target system entities;
   in response to detecting an event based on the performance metric data, display a metric object that associates an identifier (ID) of a first target system entity with a performance metric;
   in response to graphical input selection of the displayed metric object, generate an event request that specifies the first target system entity and a metric type of the performance metric;
   in response to the event request, generate a search profile that specifies:
      a metric type having a dependency with the performance metric; and
      one or more application instances within the target system; and
   generate and send application log requests to one or more service domain agents based, at least in part, on the search profile.

13. The machine-readable storage media of claim 12, wherein the program code further includes program code to:
   generate cross-domain target system configuration information including,
      determining target system entity configuration information from within each of at least two of the service domains; and
      comparing the target system entity configuration information from within each of at least two of the service domains to generate inter-entity configuration information for target system entities in different service domains.

14. The machine-readable storage media of claim 13, wherein the program code further includes program code to generate the search profile by:
   identifying a first service domain that includes the first target system entity; and utilizing a service domain ID corresponding to the identified first service domain to locate inter-entity configuration information associated with the first target system entity.

15. The machine-readable storage media of claim 14, wherein the program code further includes program code to identify the one or more application instances by:
    locating application performance data for application instances external to the first service domain; and
    correlating the application performance data to determine performance dependencies between the first target system entity and application instances external to the first service domain.

16. The machine-readable storage media of claim 15, wherein the program code to generate and send log requests includes program code to:
    for each of at least one of the application instances for which a performance dependency is determined,
        determine whether the application instance includes an event log native to the application instance; and
        for each application instance determined to have an event log, query the event log based on the log request.

17. An apparatus comprising:
    a processor; and
    a machine-readable medium having program code executable by the processor to cause the apparatus to,
        monitor performance data in service domains that are configured within a target system that includes multiple target system entities, wherein each of the service domains includes agents that monitor and record performance metric data for a set of the target system entities;
        in response to detecting an event based on the performance metric data, display a metric object that associates an identifier (ID) of a first target system entity with a performance metric;
        in response to graphical input selection of the displayed metric object, generate an event request that specifies the first target system entity and a metric type of the performance metric;
        in response to the event request, generate a search profile that specifies:
            a metric type having a dependency with the performance metric; and
            one or more application instances within the target system; and
        generate and send application log requests to one or more service domain agents based, at least in part, on the search profile.

18. The apparatus of claim 17, wherein the program code further includes program code executable by the processor to cause the apparatus to:
    generate cross-domain target system configuration information including,
        determining target system entity configuration information from within each of at least two of the service domains; and
        comparing the target system entity configuration information from within each of at least two of the service domains to generate inter-entity configuration information for target system entities in different service domains.

19. The apparatus of claim 18, wherein the program code further includes program code executable by the processor to cause the apparatus to generate the search profile by:
    identifying a first service domain that includes the first target system entity; and
    utilizing a service domain ID corresponding to the identified first service domain to locate inter-entity configuration information associated with the first target system entity.

20. The apparatus of claim 19, wherein the program code further includes program code executable by the processor to cause the apparatus to identify the one or more application instances by:
    locating application performance data for application instances external to the first service domain; and
    correlating the application performance data to determine performance dependencies between the first target system entity and application instances external to the first service domain.

* * * * *

UNITED STATES PATENT AND TRADEMARK OFFICE
CERTIFICATE OF CORRECTION

PATENT NO.      : 10,257,060 B2
APPLICATION NO. : 15/470308
DATED           : April 9, 2019
INVENTOR(S)     : Kiran Prakash Diwakar It is certified that error appears in the above-identified patent and that said Letters Patent is hereby corrected as shown below:

In the Claims

Column 15, Line 24, cancel the text beginning with "determining target system" to and ending "service domains; and" and in Column 15, Line 26 insert the following:
--determining target system entity configuration information from within each of at least two of the service domains; and--

Signed and Sealed this
Eleventh Day of June, 2019

Andrei Iancu
*Director of the United States Patent and Trademark Office*